US012518615B2

(12) United States Patent
Bouchard et al.

(10) Patent No.: US 12,518,615 B2
(45) Date of Patent: Jan. 6, 2026

(54) CONTROL PANEL MANAGED TESTING OF ALARM INITIATING DEVICES

(71) Applicant: Tyco Fire & Security GmbH, Neuhausen am Rheinfall (CH)

(72) Inventors: Kim Bouchard, Montreal (CA); Meagen Wyganowski, Châteauyuay (CA)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 69 days.

(21) Appl. No.: 18/400,462

(22) Filed: Dec. 29, 2023

(65) Prior Publication Data

US 2025/0218278 A1 Jul. 3, 2025

(51) Int. Cl.
*G08B 29/00* (2006.01)

(52) U.S. Cl.
CPC .................................... *G08B 29/00* (2013.01)

(58) Field of Classification Search
CPC ........ G08B 29/00; G08B 29/145; G08B 7/06; G08B 25/10
See application file for complete search history.

(56) References Cited

U.S. PATENT DOCUMENTS

2015/0248832 A1* 9/2015 Piccolo, III .......... G08B 29/145 340/514

FOREIGN PATENT DOCUMENTS

WO 2015/128800 A2 9/2015

* cited by examiner

*Primary Examiner* — An T Nguyen
(74) *Attorney, Agent, or Firm* — ArentFox Schiff LLP

(57) ABSTRACT

Example aspects include techniques for managing alarm initiating devices. These techniques may include receiving, at a control panel, a first signal indicating that an alarm initiating device has entered a test mode in response to activation of a test switch of the alarm initiating device. In addition, the techniques may include updating, at the control panel, device information to indicate that the alarm initiating device has entered a test mode and receiving, at the control panel, a second signal indicating detection of a hazard indication at the alarm initiating device. Further, the techniques may include preventing an alarm alert process of the control panel associated with the hazard indication based upon on the device information indicating that the alarm initiating device has entered the test mode.

17 Claims, 8 Drawing Sheets

CONTROL PANEL MANAGED TESTING OF ALARM INITIATING DEVICES

BACKGROUND

Fire alarm systems are often installed within buildings such as commercial, residential, or governmental buildings. Examples include hospitals, warehouses, schools, malls and casinos, to list a few examples. These fire alarm systems typically include a control panel and alarm initiating devices and alarm notification devices, which are installed throughout the buildings. Some examples of alarm initiating devices include smoke sensors, carbon monoxide detectors, heat sensors, and pull stations. Some examples of alarm notification devices include speakers/horns, bells/chimes, light emitting diode (LED) reader boards, and/or flashing lights (e.g., strobes).

The alarm initiation devices monitor the buildings for indications of hazards (e.g., fires). Indications of fire include flame, heat, and smoke, in examples. Upon detection of an indication of fire, the device is activated and an alarm message is sent from the activated device to the fire control panel. Typically, the fire control panel generates an alarm condition in response to receiving the alarm messages. The alarm condition activates audio and visible alarms of the alarm notification devices of the fire alarm system and sends a message to a fire department, central receiving station, local monitoring station, and/or other building alarm/notification systems.

Typically, the fire alarm initiation and alarm notification devices are periodically tested (e.g., monthly, quarterly, or annually) depending on local interpretation and enforcement of fire protection codes) to verify that the fire detection and alarm notification devices are physically sound, unaltered, working properly, and located in their assigned locations. This testing of the fire alarm initiation and alarm notification devices is often accomplished with a walkthrough test.

In some aspects, the fire alarm initiation and alarm notification devices targeted for testing were organized into zones. During testing, the control panel was placed into a test mode that selected one zone at a time for testing. The control panel sent control messages to disable all devices in the tested zone, and disabled its ability to generate an alarm condition in response to receiving alarm messages from devices in the tested zone.

Historically, walkthrough tests were performed by a team of at least two inspectors as part of a two person walkthrough system. In more detail, the first inspector walked through the building and manually activated each fire alarm initiation device and alarm notification device in the tested zone while the second inspector remained at the control panel to verify that the control panel received an alarm message from the activated device. The inspectors would typically communicate via two-way radios or mobile phones to coordinate the testing of each device. In some cases, the inspectors might even have resorted to comparing hand written notes of the tested devices.

After a zone of devices were tested, the inspector at the panel reset the control panel while the other inspector moved to the next zone of fire alarm initiation or alarm notification devices. The control panel was then placed into test mode for the next zone of devices.

The two-person walkthrough system had many limitations. The system required two inspectors and additional components beyond the control panel and target devices, such as two-way radios and/or mobile phones. The system also required significant coordination among the inspectors. For example, the inspector at the control panel could place the control panel into a test mode for the wrong zone, resulting in false alarms. Moreover, because all devices in each tested zone were disabled, the devices would not detect an actual fire in the tested zone. As a result, a "fire watch" was required, where the second inspector (and possibly other individuals) had to manually watch for indications of fire within the tested zone.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In some aspects, the techniques described herein relate to a method, including: receiving, at a control panel, a first signal indicating that an alarm initiating device has entered a test mode in response to activation of a test switch of the alarm initiating device; updating, at the control panel, device information to indicate that the alarm initiating device has entered a test mode; receiving, at the control panel, a second signal indicating detection of a hazard indication at the alarm initiating device; and preventing an alarm alert process of the control panel associated with the hazard indication based upon on the device information indicating that the alarm initiating device has entered the test mode.

In some aspects, the techniques described herein relate to a non-transitory computer-readable device storing instructions thereon that, when executed by at least one computing device, causes the at least one computing device to perform operations including: receiving, at a control panel, a first signal indicating that an alarm initiating device has entered a test mode in response to activation of a test switch of the alarm initiating device; updating, at the control panel, device information to indicate that the alarm initiating device has entered a test mode; receiving, at the control panel, a second signal indicating detection of a hazard indication at the alarm initiating device; and preventing an alarm alert process of the control panel associated with the hazard indication based upon on the device information indicating that the alarm initiating device has entered the test mode.

In some aspects, the techniques described herein relate to an alarm system, including: an alarm initiating device that detects a hazard indication and includes a test switch is a magnetic reed switch that is activated when a hood of a test tool is placed over the alarm initiating device, the hood including a magnet that comes within proximity of the magnetic reed switch to activate the magnetic reed switch; and a control panel that includes: one or more memories storing instructions; and one or more processors communicatively coupled with the one or more memories and configured to execute the instructions to: receive, at a control panel, a first signal indicating that an alarm initiating device has entered a test mode in response to activation of a test switch of the alarm initiating device; update, at the control panel, device information to indicate that the alarm initiating device has entered a test mode; receive, at the control panel, a second signal indicating detection of a hazard indication at the alarm initiating device; and prevent an alarm alert process of the control panel associated with the hazard indication based upon on the device information indicating that the alarm initiating device has entered the test mode.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The Detailed Description is set forth with reference to the accompanying figures, in which the left-most digit of a reference number identifies the figure in which the reference number first appears. The use of the same reference numbers in the same or different figures indicates similar or identical items or features.

DETAILED DESCRIPTION

Figure 1:
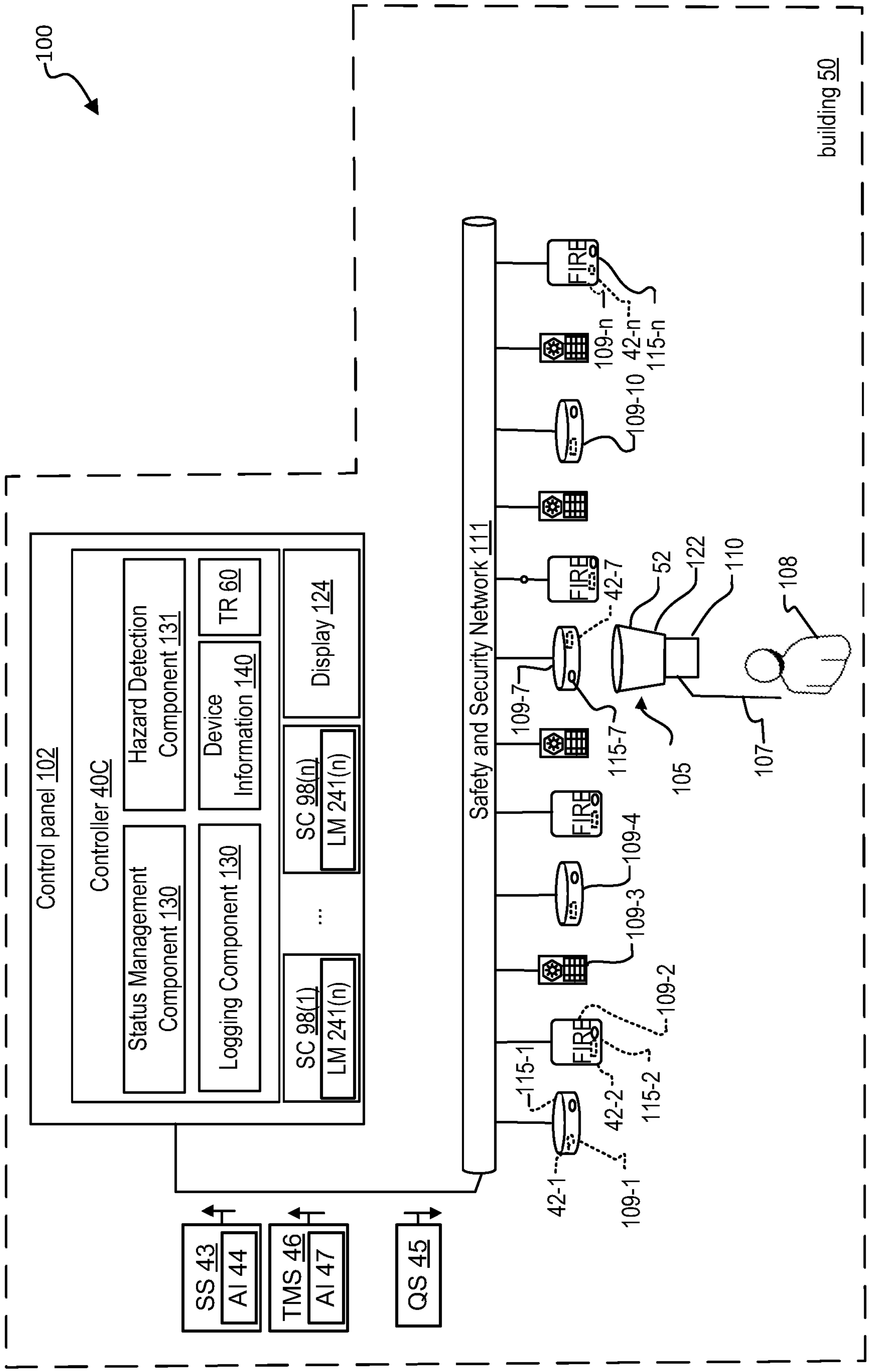
FIG. 1 is a block diagram illustrating a fire alarm system installed at a building, where the system includes alarm initiating devices and alarm notification devices, and where an inspector carrying a test tool for individual testing of the devices is also shown, in accordance with some aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known components are shown in block diagram form in order to avoid obscuring such concepts.

Implementations of the present disclosure provide systems, methods, and apparatuses that manage alarm initiating devices. These systems, methods, and apparatuses will be described in the following detailed description and illustrated in the accompanying drawings by various modules, blocks, components, circuits, processes, algorithms, among other examples (collectively referred to as "elements"). These elements may be implemented using electronic hardware, computer software, or any combination thereof. Whether such elements are implemented as hardware or software depends upon the particular application and design constraints imposed on the overall system. By way of example, an element, or any portion of an element, or any combination of elements may be implemented as a "processing system" that includes one or more processors. Examples of processors include microprocessors, microcontrollers, graphics processing units (GPUs), central processing units (CPUs), and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, among other examples, whether referred to as software, firmware, middleware, microcode, hardware description language, or otherwise. If implemented in software, the functions may be stored on or encoded as one or more instructions or code on a computer-readable medium. Computer-readable media includes computer storage media, which may be referred to as non-transitory computer-readable media. Non-transitory computer-readable media may exclude transitory signals. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

This disclosure describes techniques for managing alarm initiating devices. The present invention addresses many limitations of previous walkthrough systems. Traditional systems required two inspectors, additional equipment beyond the control panel and target devices (like two-way radios or mobile phones), and significant coordination among the inspectors. These complexities introduced opportunities for human error, such as placing the control panel into test mode for the incorrect zone, which could lead to false alarms. Moreover, older systems disabled all devices in each tested zone, thereby creating a safety risk as these devices would not detect an actual hazard in the test zone. This necessitated a "fire watch," where a second inspector or other individuals had to manually watch for indications of fire within the tested zone. The present invention significantly improves upon these older systems. As described herein, a control panel receives a signal indicating when an alarm initiating device enters test mode, and updates centralized device information accordingly. When the control panel receives a second signal indicating a hazard detected by the alarm initiating device, the control panel prevents the alarm alert process if the device information indicates the alarm initiating device is in test mode. This method effectively eliminates the need for a second inspector and additional equipment, reduces the chance of human error, and does away with the need for a "fire watch," as the system is designed to avoid false alarms during testing. This ensures that crucial alerts are taken seriously, thereby enhancing the overall reliability of the alarm system without compromising safety.

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

It will be understood that although terms such as "first" and "second" are used herein to describe various elements, these elements should not be limited by these terms. These terms are only used to distinguish one element from another element. Thus, an element discussed below could be termed a second element, and similarly, a second element may be termed a first element without departing from the teachings of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram illustrating an alarm system 100 installed at a building 50.

The alarm system 100 includes alarm initiating devices and alarm notification devices (AI/AN devices) 109 and a control panel 102. The devices 109 are mounted to walls and/or ceilings of the building 50 and communicate with the control panel 102 over a safety and security network 111.

Alarm initiating devices such as smoke sensors 109-1/109-7, a heat sensor 109-4, a carbon monoxide detector 109-10, and pull stations 109-2 are shown. Alarm notification devices such as strobes 109-3 are also shown. Each of the alarm initiating devices and alarm notification devices 109-1 through 109-*n* respectively include a test switch 42-1 through 42-*n*, and a light emitting device 115-1 through 115-*n*.

In some aspects, each alarm initiating device 109 includes a fire detection system for detecting an indication of fire, test switch 42 that is deactivated by default and activated during testing of the AI/AN device 109, and a controller 40S. The controller 40S senses an indication of a hazard (e.g., an indication of a fire), and in response, the controller 40S generates a state signal (SS) 43 and transmits the state signal 43 to the control panel 102. In some aspects, the state signal 43 includes analog information (AI) 44 indicating an occurrence of a hazard and/or one or more hazard indicating measurements determined by the controller 40S. For example, the analog information 44 may indicate that the alarm initiating device 109 has detected an occurrence of a fire and/or a sensor value determined by a hazard sensing device (e.g., sensors and detecting systems) of the AI/AN 109. In some aspects, the controller 40S may transmit the state signal 43 in response to a query signal (QS) 45 received from the control panel 102.

Further, in some aspects, the controller 40S senses the activation of the test switch 42, and in response, the controller 40S generates a test mode signal (TMS) 46 and transmits the test mode signal 46 to the control panel 102. In some aspects, the test mode signal 46 includes analog information 47 indicating that the test mode signal 46 represents that the AI/AN 109 has entered the test mode. In addition, in some aspects, the controller 40S senses the deactivation of the test switch 42, and in response, the controller 40S generates a test mode signal 46 and transmits the test mode signal 46 to the control panel 102. In some aspects, the test mode signal 46 includes analog information 47 indicating that the test mode signal 46 represents that the alarm initiating device 109 has exited the test mode.

The control panel 102 includes a display 124, a controller 40C and one or more slave cards (SC) 98(1)-(*n*). In one implementation, the control panel 102 has a backplane or equipment rack that accepts and contains the slave cards 98. One such slave card 98 is shown. In another implementation, the slave cards 98 are contained in an equipment rack or housing that is separate from the control panel 102.

The slave cards 98 include local memory (LM) 241 and operate as an intermediary between the devices 109 on the network 111 and the control panel 102. The slave cards 98 provide power to the devices 109 over the network 111, insulate the control panel 102 from faults associated with the devices 109, and provide a communications interface between the control panel 102 and the devices 109. In this way, the slave cards 98 operate as an intermediary between the control panel 102 and the devices 109.

Each slave card 98 supports a certain number of devices that form a group that are usually associated with one or more loops and/or zones. When an inspector adds more devices 109 to the alarm system 100, additional slave cards 98 are added to provide power to the devices 109 and to enable communications with the control panel 102 and the devices 109. In this way, the control panel 102 can support an increasing number of devices 109 without requiring changes to the control panel 102 itself.

The slave cards 98 monitor the devices 109 for faults. Upon detecting a fault with one or more of the devices 109 in its group/zone, each slave card 98 can isolate/disable problem devices 109 and notify the control panel 102.

Each slave card 98 receives and accumulates messages (e.g., state signals 43) from its group of devices 109, and determines whether to forward the messages to the control panel 102. The messages include message information (e.g., analog information 44) associated with alarms. When the messages are alarm messages, the slave devices 98 forward the alarm messages to the control panel 102.

The slave cards 98 also receive information sent from the control panel 102 on behalf of the devices 109. In one example, when the control panel raises an alarm condition, the information includes notification signals that the control panel 102 sends to alarm notification devices 109 to notify and warn building occupants. The slave cards 98 then forward this information over the network 111 to its devices 109 and also sends instructions to activate those devices. In another example, the information includes control signals that enable/disable one or more devices 109.

When the controller 40C receives alarm messages forwarded by the slave cards 98, the control panel 102 raises an alarm condition. In response to the alarm condition, the control panel 102 sends notification signals to the slave cards 98, displays the locations of the device(s) that sent the alarm messages on the display 124, and notifies a call center or monitoring service. The monitoring service then dispatches first responders such as a fire brigade to the building 50.

In some aspects, the controller 40C or each slave card 98 may include a status management component 130, a hazard detection component 131, and a logging component 132. In some aspects, the status management component 130 receives messages from the slave cards 98, and determines whether the messages indicate that an AI/AN 109 has entered or exited a test mode. For example, the status management component 130 may receive a test mode signal 46 from an AI/AN device 109 and identify the presence of analog information 47 indicating that the AI/AN device 109 has entered the test mode. Further, the status management component 130 may update the device information 140 to indicate that the AI/AN 109 has entered the test mode based on receipt of a test mode signal 46 from the AI/AN device 109 including analog information 47 indicating that the AI/AN device 109 has entered the test mode. As another example, the status management component 130 may receive a test mode signal 46 from an AI/AN device 109 and identify the presence of analog information 47 indicating that the AI/AN device 109 has exited the test mode. Further, the status management component 130 may update the device information 140 to indicate that the AI/AN 109 has exited the test mode based upon receipt of a test mode signal 46 from the AI/AN device 109 including analog information 47 indicating that the AI/AN device 109 has exited the test mode. As yet still another example, in some aspects, the status management component 130 may update the device information 140 to indicate that the AI/AN 109 has exited the test mode based upon a predefined passage of time.

In some aspects, the hazard detection component 131 may query the AI/AN device 109 for state information. For example, the hazard detection component 131 may receive a first state signal 43 from an AI/AN device 109 indicating the potential occurrence of a hazard within the building 50, and transmit a query signal 45 to the AI/AN device 109 for a second state signal 43 including analog information 44 representing sensor values captured by the AI/AN device 109.

Further, the hazard detection component 131 may determine whether a state signal 43 is indicative of a hazard within the building that necessitates raising an alarm condition. For example, in some aspects, the hazard detection component 131 may identify analog information 44 within a state signal 43, and compare the analog information 44 to a threshold value to determine whether there is a detection of a hazard at the AI/AN device 109 that transmitted the state signal 43. In some aspects, the hazard detection component 131 detects the occurrence of a hazard based upon the analog information 44 corresponding to a sensor value greater than the threshold value. Alternatively, in some other aspects, the hazard detection component 131 detects the occurrence of a hazard based upon the analog information 43 corresponding to a sensor value lesser than the threshold value. In some aspects, the AI/AN device 109 may transmit the state signal 43 to the hazard detection component 131 in response to a hazard detected by an AI/AN device 109 or the AI/AN device 109 may transmit the state signal 43 to the hazard detection component 131 in response to a query signal 45 transmitted by the hazard detection component 131.

Further, in response to detecting the occurrence of a hazard, the hazard detection component 131 determines whether the AI/AN device 109 that transmitted the state signal 43 is in test mode. For example, if the hazard detection component 131 determines that the AI/AN device 109 that transmitted the state signal 43 is in test mode based on the device information 140, the hazard detection component 131 may prevent the control panel 102 from raising an alarm condition. In particular, the hazard detection component 131 may prevent the control panel 102 from notifying a call center or monitoring service of the hazard. Further, the hazard detection component 131 may send a notification signal to the slave cards 98, and cause the control panel 102 to display the location of the AI/AN device 109 that sent the alarm message (i.e., the state signal having analog information corresponding to a hazard) on the display 124 with an indication that the alarm corresponds to a test. Alternatively, in some other aspects, the hazard detection component 131 may prevent transmission of a notification signal to the slave cards 98, and prevent the control panel 102 from displaying the location of the AI/AN device 109 that sent the alarm message.

In addition, the logging component 132 may log the results of tests performed at the AI/AN devices 109 as test results (TR) 60. For example, the logging component 132 may log entering and exiting of the test mode at an AI/AN device 109 based on receipt of test mode signals 46. In addition, the logging component 132 may log state information received from an AI/AN device 109 while the AI/AN device 109 is in test mode within the test results 60. For example, the logging component 132 may log that a hazard was detected during a test mode within the test results 60 in response to a sensor value represented within a state signal 43 received during the test mode being greater than a hazard threshold. As another example, the logging component 132 may log one or more sensor values within the test results 60 based on the one or more sensor values being represented in analog information 44 of a state signal 43 received during the test mode.

In the illustrated example, an inspector 108 is also shown carrying a test tool 105. The inspector 108 uses the test tool 105 to individually test the alarm initiating devices 109. The test tool 105 includes a base 110, a wand 107 attached to the base, and a hood 122 attached to the base 110. A magnet 52 as an example of a test switch activation mechanism is located within the hood 122. In some aspects, the inspector 108 may endeavor to initiate testing of smoke sensor 109-7. For this purpose, the inspector 108 places the hood 122 of the test tool 105 over the smoke sensor 109-7.

Figure 2:
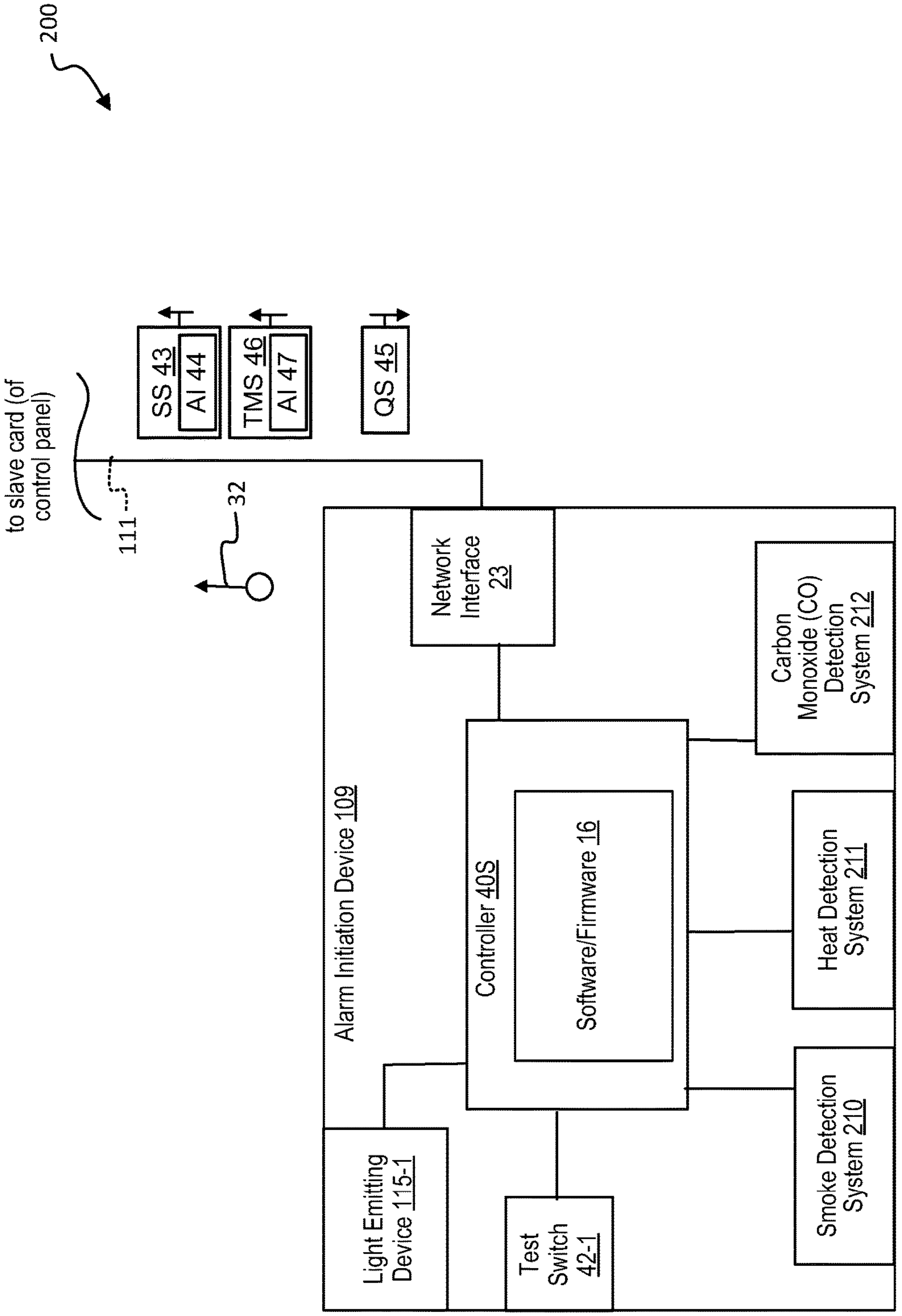
FIG. 2 is a block diagram of an exemplary alarm initiating device, in accordance with some aspects of the present disclosure, where the diagram shows various components of the alarm initiating device.

FIG. 2 is a block diagram showing more detail for an embodiment of a fire alarm initiation device 109 in FIG. 1.

The fire alarm initiation device 109 has various components. The components include a controller 40S, an indicator such as a light emitting device 115-1, a test switch 42-1 and a network interface 23. In a preferred embodiment, the test switch 42-1 is a magnetic reed switch. In addition, the AI/AN device 109 includes a fire detection system that detects an indication of fire. In the illustrated example, the AI/AN device 109 has three different fire sensing modalities. Specifically, the fire detection system of the AI/AN device 109 includes a smoke detection system 210, a heat detection system 211, and a carbon monoxide (CO) detection system 212.

While some fire alarm initiation devices 109 have two or all three fire sensing modalities, other devices 109 have only one of the fire sensing modalities. In one example, a device 109 that has only a smoke detection system 210 as its fire detection system is also known as a smoke sensor 109-1/109-7. In another example, a device 109 that includes only a heat detection system 211 as its fire detection system is also known as a heat sensor 109-4. The heat detection system 211, in examples, uses heat-sensitive thermocouples and/or thermistors. In yet another example, a device 109 that includes only a CO detection system 212 as its fire detection system is also known as a carbon monoxide detector 109-10. In examples, the CO detection system 212 uses one or more of biomimetic sensors, metal oxide semiconductors, electrochemical sensors, and opto-chemical sensors to detect the CO.

The controller 40S includes software and/or firmware 16 and controls the light emitting device 115-1, the network interface 23 and the fire detection system. The software and/or firmware 16 include a pre-programmed set of instructions for operating the alarm initiating device 109. The set of instructions for operating the AI/AN device 109 enable the controller 40S (and thus the AI/AN device 109) to operate in different modes such as a normal mode and a test mode. The controller 40S also prepares messages and signals for transmission to the control panel 102 via the network interface 23.

The light emitting device 115-1 can take multiple forms. In one implementation, the light emitting device 115-1 is a light emitting diode (LED). In another implementation, the device 115-1 is an incandescent light bulb.

The test switch 42-1 controls testing of the alarm initiating device 109. The test switch 42-1 is normally deactivated and the AI/AN device 109 is in a normal mode. In a preferred embodiment, the test switch 42-1 is a magnetic reed switch, which will change state (e.g., open-to-closed or closed-to-open) in response to being exposed to a magnetic field.

Other types of switches beyond magnetically activated switches are possible for the test switch 42-1. In one example, the test switch is an optical switch that is activated in response to receiving light in a predefined wavelength and/or pattern, such as a test pattern. In this way, ambient room lighting or sunlight cannot accidentally activate the test switch 42-1. In yet another example, the test switch 42-1 might also be a mechanical switch such as a momentary push button switch that is activated as long as sufficient force is applied to the switch 42-1, and is deactivated once the force is removed. In yet another example, the test switch 42-1 is an ultrasonic switch.

At startup, the fire alarm initiation device 109 is placed in its normal mode of operation by its controller 40S. When in normal mode, the fire detection system of the device monitors and detects an indication of fire (e.g., smoke, heat, and/or carbon monoxide), and sends an alarm message 32 to the control panel 102 in response to the fire detection system detecting the indication of fire. When the test tool 105 comes within proximity of the AI/AN device 109, however, the test switch 42-1 is activated. In one example, a magnetic reed switch as the test switch 42-1 is activated when the magnet 52 of the test tool 105 comes within proximity of the magnetic reed switch. The controller 40S senses the activation of the test switch 42-1, and in response, the controller 40S places the AI/AN device 109 into a test mode. Upon activation of the test switch 42-1, the fire alarm initiation device 109 enters its test mode, and transmits a test mode signal 46 to a control panel 102 which indicates that the AI/AN device 109 has entered the test mode.

The indicator (e.g., light emitting device 115-1, speaker) is also energized during testing to indicate that testing of the fire alarm initiation device 109 is in progress. This provides visual or audible indications to the inspector and other building occupants during the testing of the AI/AN device 109. Once the inspector sees or hears the visual and/or audible indication that the device is in test mode, the inspector triggers the test tool 105 to release and deliver the appropriate indication of fire (e.g., smoke, heat, carbon monoxide) near the device. The term "smoke" includes both actual smoke from a fire, artificial smoke, or smoke equivalent delivered by the test tool 105 during testing.

After the fire alarm initiation device 109 completes testing, the inspector 108 removes the test tool 105 from proximity of the AI/AN device 109. As a result, the test switch 42-1 is deactivated. The controller 40S detects/senses the deactivation of the test switch 42-1, and introduces a delay before placing the AI/AN device 109 back in its normal mode, and deenergizes the indicator (e.g., light emitting device 115-1, speaker). The delay, also known as a clearing timer, is required so that the smoke, temperature, or carbon monoxide has had time to return to normal average values. In examples, the delay is as small as one minute, or as large as five minutes. The controller 40S deenergizes the indicator to indicate that testing of the AI/AN device 109 has completed and that device 109 is again operating in normal mode. In some aspects, upon completion of the testing, the controller 40S sends a test mode signal 46 to a control panel 102 which indicates that the AI/AN device 109 has exited the test mode.

Figure 3:
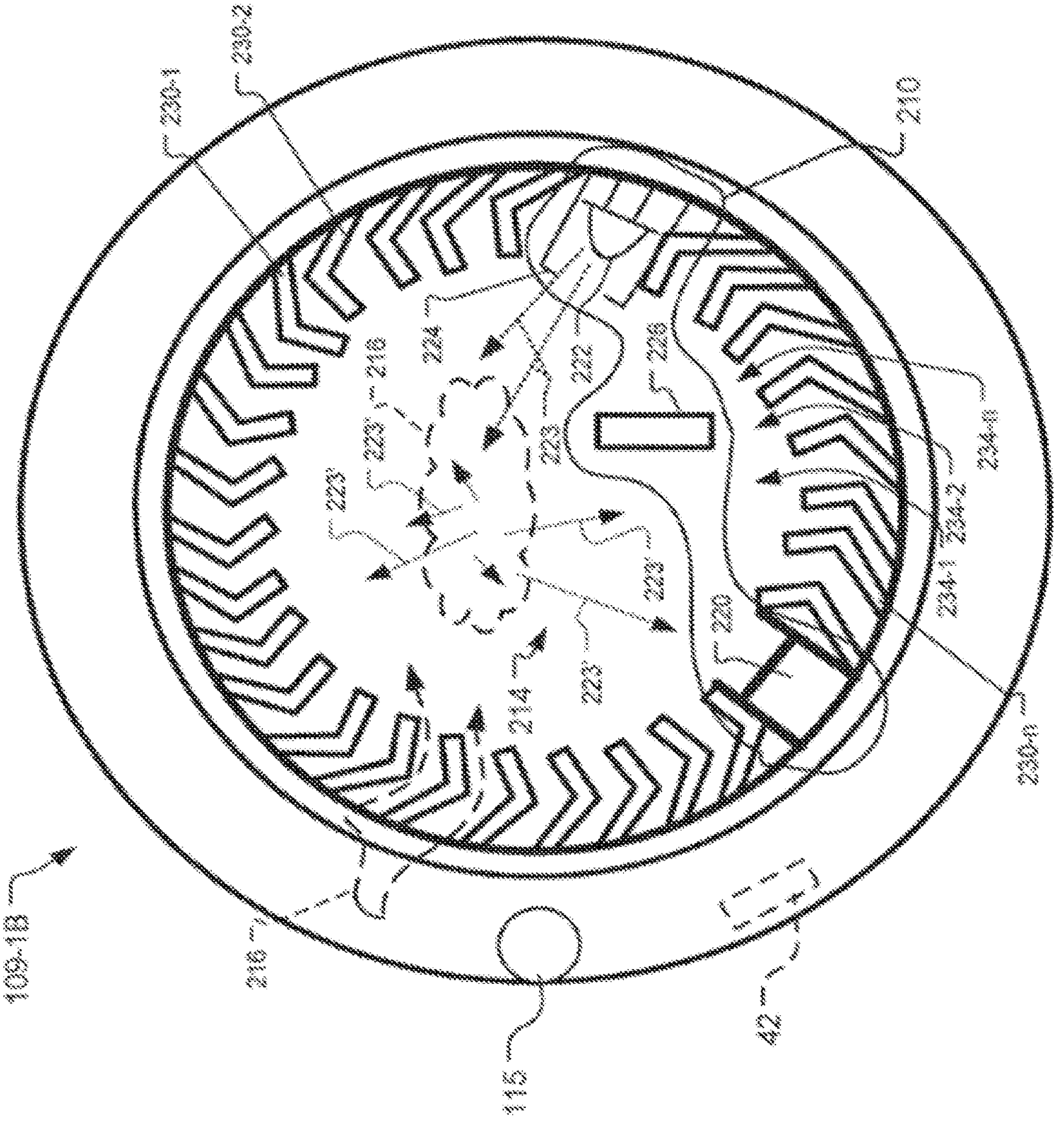
FIG. 3 is a cross-sectional view of a smoke sensor as an example of an alarm initiation device, in accordance with some aspects of the present disclosure.

FIG. 3 is a cross-sectional view of an exemplary smoke sensor 109-1B. The view illustrates operation of a smoke detection system 210 of the smoke sensor 109-1B, both during testing of the smoke sensor 109-1B and during an actual fire.

The view of the figure illustrates components of the smoke sensor 109-1B including a detection chamber 214 and the smoke detection system 210, according to an embodiment. Components of the smoke sensor 109-1B such as the controller 40S and local memory 24S are mounted to a circuit board within the smoke sensor 109-1B and are hidden from view.

In this embodiment, the detection chamber 214 is defined by individual baffles 230-1 to **230-*n*. The arrangement of the baffles 230-1 to 230-*n* form pathways 234-1 to 234-*n* that allow airflow and possibly environmental smoke 216 to flow into the detection chamber 214**. The baffles are also commonly referred to as channels, vanes, walls, or labyrinths, to list a few examples.

The smoke detection system 210 detects the presence of smoke within the detection chamber 214. In the illustrated example, the smoke detection system 210 includes a chamber light source 222 for generating light 223, a blocking baffle 206, and a scattered light photodetector 220. The scattered light photodetector 220 detects light that has been scattered due to the smoke 216 collecting within the detection chamber 214.

The smoke detection system 210 generally operates as follows. Light 223 from the chamber light source 222 is directed into the detection chamber 214 through an aperture 224. If particulates such as smoke 216 is present in the detection chamber 214, the light 223 is scattered by the smoke 216, resulting in scattered light 223'. The scattered light 223' is then detected by the scattered light photodetector 220. The blocking baffle 226 is installed within the detection chamber 214 to prevent the light 223 from having a direct path to the scattered light photodetector 220. The photodetector 220 then generates a signal having a value that is proportional to the level of scattered light 223' detected by the photodetector 220.

As the number of particulates/incidence of smoke increases within the chamber 214, the amount of scattered light 223' increases, which is detected by the scattered light photodetector 220. Thus, in this way, the signal generated by the photodetector 220 is indicative of the concentration of an optically scattering medium, such as smoke 216, within the detection chamber 214.

The controller 40S receives the signal generated by the photodetector 220 and compares the signal to a threshold level maintained by the controller 40S. The threshold level represents an amount of smoke or other indication of fire that is associated with a fire condition in the building 50. When the signal generated by the photodetector 220 meets or exceeds the threshold level, the controller 40S sends a state signal 43 to the control panel 102 and possibly activates a local siren of the smoke detector 109-1B.

Figure 4A:
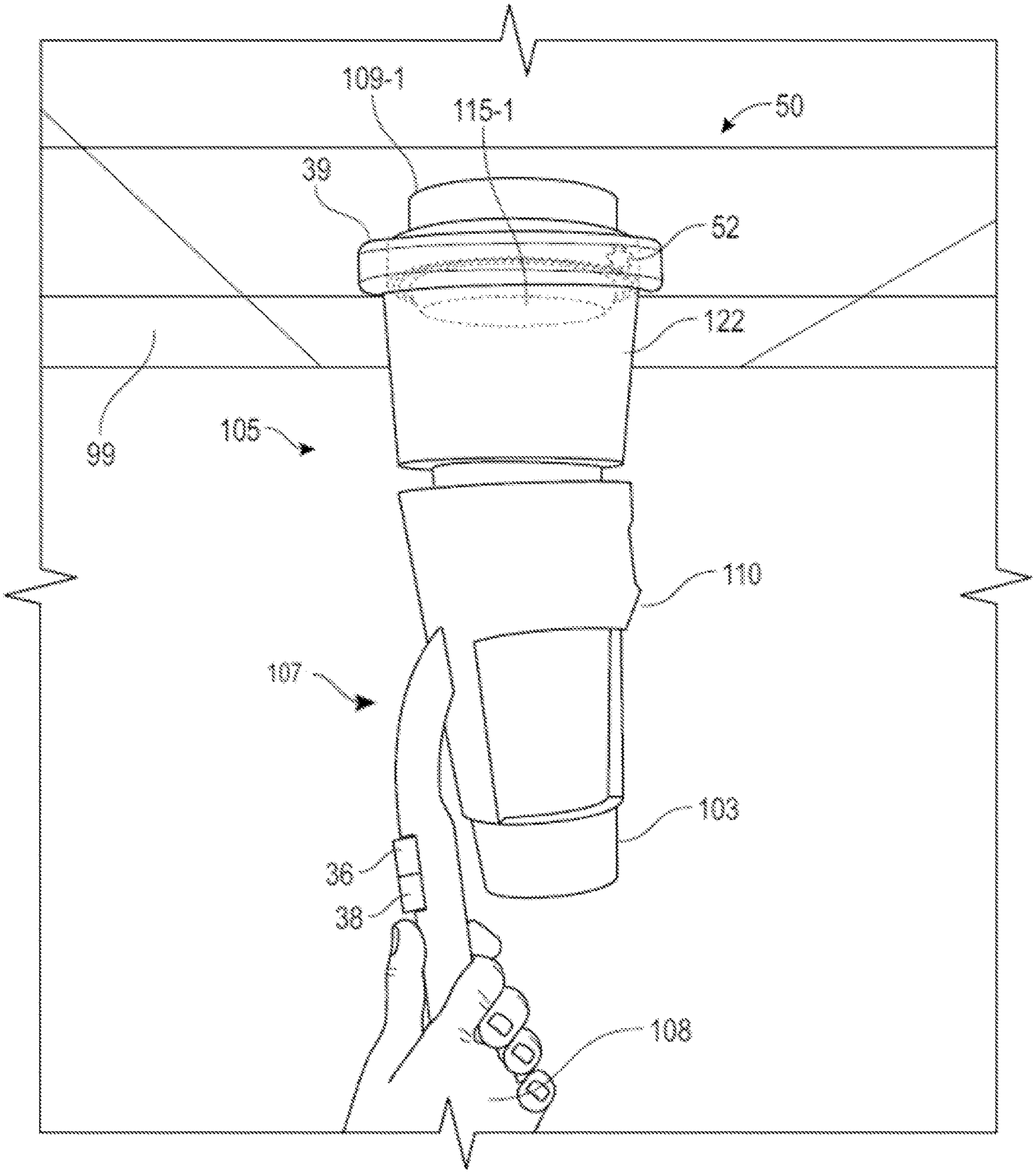
FIG. 4A is an image showing an inspector placing an embodiment of the test tool over an exemplary smoke sensor for testing the smoke sensor, where the smoke sensor is installed in a ceiling within a room of the building, in accordance with some aspects of the present disclosure.

FIG. 4A is an image showing an inspector 108 placing an embodiment of the test tool 105 over an alarm initiating device, such as smoke sensor 109-1 of FIG. 1. The inspector 108 places a hood 122 of the test tool 105 over the smoke sensor 109-1 to initiate testing of the smoke sensor 109-1.

Some components of the test tool 105 are shown. The test tool 105 includes a base 110 and a hood 122 attached to the base 110, and includes a handle or wand 107.

The hood 122 has several components. The hood 122 has a mouth 39 made of a resilient material such as rubber or plastic, in examples. The mouth 39 defines an opening. The hood 122 and the mouth 39 are also made from a substantially transparent material so that an inspector can see the indicator 115-1 being energized during testing.

The base 110 contains a replaceable cartridge or canister 103 such as an aerosol canister for delivering smoke 216, heat, or carbon monoxide during testing of the smoke sensor 109-1.

The wand 107 has a wand activation mechanism (here, buttons 36 and 38) that execute different operations. Button 38 executes operations during testing of the smoke sensor 109-1, such as controlling the generation of smoke 216 from the base 110 into the hood 122. Button 36 executes a self-test of the test tool 105 itself.

The smoke sensor 109-1 is shown installed in a ceiling 99 of a building 50. An inspector 108 is shown placing the opening of the hood 122 such that the mouth 39 encloses the installed smoke sensor 109-1. When the mouth 39 is pressed against a ridge of the sensor 109-1 or against a surface upon which the sensor 109-1 is mounted (e.g., ceiling 99), the mouth 39 forms a tight seal between the smoke sensor 109-1 or ceiling, much like a gasket.

The magnet 52 is mounted to/located within an inside rim of the hood 112, at a specific height below the mouth 39. This height coincides with a corresponding depth of the magnetic reed switch 42-1 of the smoke sensor 109-1, measured from the mounting surface of the smoke sensor 109-1 (here, ceiling 99). In this way, when the mouth 39 of the hood 112 is placed tightly over the smoke sensor 109-1, the magnet 52 will be aligned with and opposite to the magnetic reed switch 42-1 of the smoke sensor 109-1. As a result, the magnetic reed switch 109-1 is activated, and the controller 40S senses the activation.

In the figure, the inspector 108 has placed the mouth 39 of the hood 112 over the smoke sensor 109-1 such that a tight seal is formed between the mouth 39 and the smoke sensor 109-1. In another example, the mouth 39 might also enclose the entirety of the smoke sensor 109-1, and form a tight fit between the surface upon which the smoke sensor 109-1 is mounted (e.g., ceiling 99) and the mouth 39.

Testing of the smoke sensor 109-1 is shown in progress. The indicator (e.g., light emitting device 115-1) is energized during testing, and is visible to the inspector 108 through the transparent hood 122.

Once placement of the hood 112 over the smoke sensor 109-1 occurs as described hereinabove, the inspector 108 selects button 38 for the canister 103 to deliver smoke 216, heat, or CO. The tight seal between the mouth 39 and the smoke sensor 109-1/ceiling area around the smoke sensor 109-1 allows the smoke 216, heat, or CO to flow directly from the hood 122 to the smoke detection system 210 of the smoke sensor 109-1, for testing the smoke detection system 210.

Figure 4B:
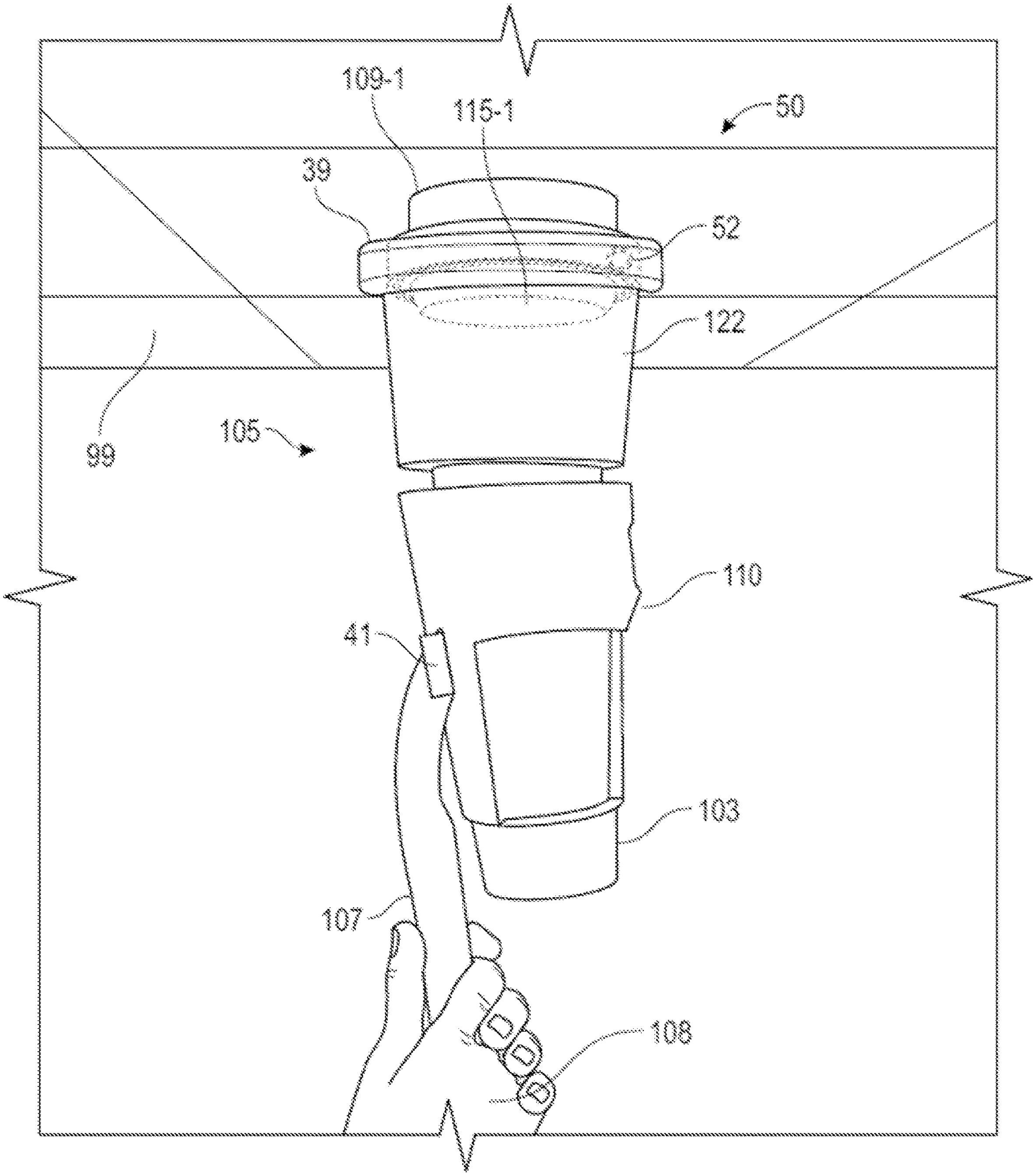
FIG. 4B is an image showing an inspector placing another embodiment of the test tool over an exemplary smoke sensor for testing the smoke sensor, in accordance with some aspects of the present disclosure.

FIG. 4B is an image showing an inspector 108 placing another embodiment of the test tool 105 over an alarm initiating device, such as smoke sensor 109-1 of FIG. 1. As in FIG. 4A, the inspector 108 in FIG. 4B places a hood 122 of the test tool 105 over the smoke sensor 109-1 to initiate testing of the smoke sensor 109-1.

The wand 107 of the test tool 105 in FIG. 4B has a pressure switch 41 as its wand activation mechanism. The pressure switch 41 is activated when the mouth 39 of the hood 112 is placed over the smoke sensor 109-1, and the inspector 108 applies sufficient pressure on the wand 107 in a direction towards the smoke sensor 109-1. In another example, the wand activation mechanism is located near the mouth 39 of the hood 112.

Once the inspector 108 has activated the pressure switch 41, the canister 103 delivers the smoke 216, heat, or carbon monoxide as indicated in the description of FIG. 4A hereinabove.

Figure 5:
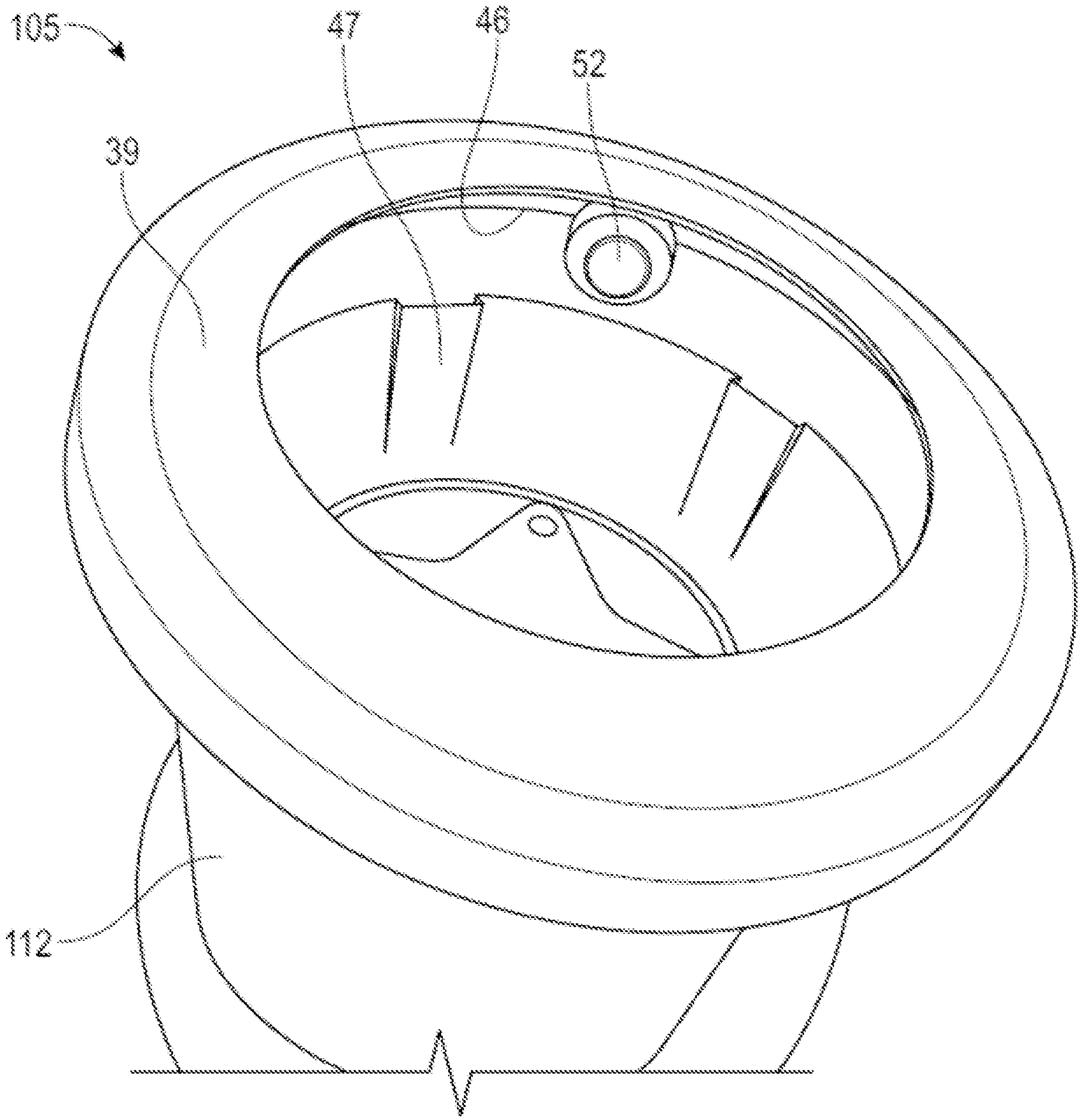
FIG. 5 is an image that shows a magnified perspective view of the test tool, where the image shows detail for a hood of the test tool that is placed over or otherwise encloses installed alarm initiating devices during testing of the devices, in accordance with some aspects of the present disclosure.

FIG. 5 is an image that shows a magnified perspective view of the test tool 105.

The image shows detail for the hood 122 of the test tool 105. The hood 122 is placed over the fire alarm initiation and alarm notification devices 109.

A sidewall 47 of the hood 122 and inside rim 46 of the mouth 39 are visible in this figure.

In one implementation, the magnet 52 is attached to the inside rim 46 of the mouth 39. In another implementation, the magnet 52 is mounted in the sidewall 47 of the hood 122.

When the test switch 42-1 is an optically-activated switch or ultrasonically-activated switch, in other examples, a light generating device or an ultrasound generating device respectively replaces the magnet 52.

The test tool 105 and the alarm initiating devices such as the smoke sensor 109-1 also form a fire testing system.

Figure 6:
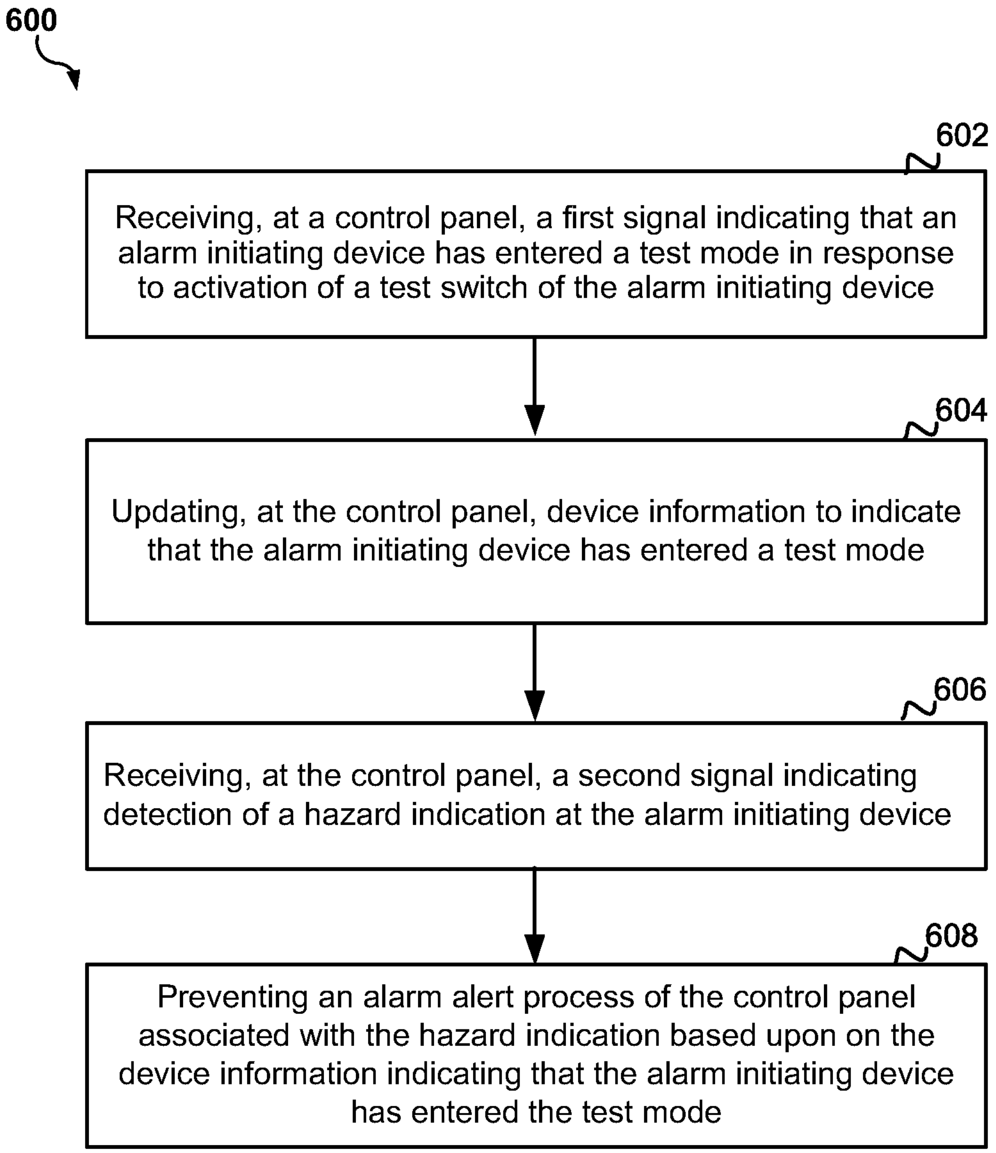
FIG. 6 is a flow chart that illustrates a method of managing alarm initiating devices, in accordance with some aspects of the present disclosure.

FIG. 6 is a flow chart that illustrates a method performed by a controller 40S of a smoke sensor, such as smoke sensor 109-1 in FIG. 2 and smoke sensor 109-1B in FIG. 3.

Referring to FIG. 6, in operation, the system 100 or computing device 700 may perform an example method 600 for providing natural language search over security videos. The method 600 may be performed by one or more components of the control panel 102, the computing device 700, or any device/component described herein according to the techniques described with reference to FIGS. 1-5 and 7.

At block 602, the method 600 includes receiving, at a control panel, a first signal indicating that an alarm initiating device has entered a test mode in response to activation of a test switch of the alarm initiating device. For example, the control panel 102 may receive a test mode signal 46 from an AI/AN device 109. Accordingly, the control panel 102, the computing device 700, and/or the processor 702 executing the status management component 130 may provide means receiving, at a control panel, a first signal indicating that an alarm initiating device has entered a test mode in response to activation of a test switch of the alarm initiating device.

At block 604, the method 600 includes updating, at the control panel, device information to indicate that the alarm initiating device has entered a test mode. For example, the control panel 102 may identify the presence of analog information 47 indicating that the AI/AN device 109 has entered the test mode. Accordingly, the control panel 102, the computing device 700, and/or the processor 702 executing the status management component 130 may provide means for updating, at the control panel, device information to indicate that the alarm initiating device has entered a test mode.

At block 606, the method 600 includes receiving, at the control panel, a second signal indicating detection of a hazard indication at the alarm initiating device. For example, the control panel 102 may receive a state signal 43 from an AI/AN device 109 indicating the potential occurrence of a hazard within the building 50. Accordingly, the control panel 102, the computing device 700, and/or the processor 702 executing the hazard detection component 131 may provide means for receiving, at the control panel, a second signal indicating detection of a hazard indication at the alarm initiating device.

At block 608, the method 600 includes preventing an alarm alert process of the control panel associated with the hazard indication based upon on the device information indicating that the alarm initiating device has entered the test mode. For example, the control panel 102 may identify analog information 44 within the state signal 43, and compare the analog information 44 to a threshold value to determine whether there is a detection of a hazard at the AI/AN device 109 that transmitted the state signal 43. In some aspects, the control panel 102 detects the occurrence of a hazard based upon the analog information 44 corresponding to a sensor value greater than the threshold value. Alternatively, in some other aspects, the control panel 102 detects the occurrence of a hazard based upon the analog information 43 corresponding to a sensor value lesser than the threshold value. Further, if the hazard detection component 131 determines that the AI/AN device 109 that transmitted the state signal 43 is in test mode based on the device information 140, the hazard detection component 131 may prevent the control panel from raising an alarm condition. In particular, the hazard detection component 131 may prevent the control panel 102 from notifying a call center or monitoring service of the hazard. Accordingly, the control panel 102, the computing device 700, and/or the processor 702 executing the hazard detection component 131 may provide means for preventing an alarm alert process of the control panel associated with the hazard indication based upon on the device information indicating that the alarm initiating device has entered the test mode.

In some aspects, the method 600 further includes logging, at the control panel, receipt of the hazard indication during the test mode of the alarm initiating device; or displaying, via a graphical user interface, a notification identifying receipt of the hazard indication during the test mode of the alarm initiating device. For example, the control panel 102 may log state information received from an AI/AN device 109 while the AI/AN device 109 is in test mode within the test results 60. As another example, the control panel 102 may display the test results 60 via a display 124. Accordingly, the control panel 102, the computing device 700, and/or the processor 702 executing the logging component 132 or user interface component 710 may provide means for logging receipt of the hazard indication during the test mode of the alarm initiating device or displaying, via a graphical user interface, a notification identifying receipt of the hazard indication during the test mode of the alarm initiating device.

In some aspects, the method 600 further includes updating, at the control panel, the device information to indicate that the alarm initiating device has exited the test mode in response to the second signal. For example, the control panel 102 may update the device information 140 to indicate that the AI/AN 109 has exited the test mode based upon receipt of a test mode signal 46 from the AI/AN device 109 including analog information 47 indicating that the AI/AN device 109 has exited the test mode. Accordingly, the control panel 102, the computing device 700, and/or the processor 702 executing the status management component 130 may provide means for updating, at the control panel, the device information to indicate that the alarm initiating device has exited the test mode in response to the second signal.

In some aspects, the alarm initiating device is a first alarm initiating device, and the method 600 further includes receiving a third signal indicating that a second alarm initiating device has entered a test mode in response to activation of a test switch of the second alarm initiating device; updating, at the control panel, the device information to indicate that the second alarm initiating device has entered the test mode; determining that a fourth signal indicating detection of a hazard indication at the second alarm initiating device has not been received within a predefined period of time; and logging, at the control panel, lack of receipt of an indication during the test mode of the second alarm initiating device. For example, the control panel 102 may log state information received from an AI/AN device 109 while the AI/AN device 109 is in test mode indicating that a state signal 43 was not received within a predefined period of time. Accordingly, the control panel 102, the computing device 700, and/or the processor 702 executing the status management component 130, the hazard detection component 131, and the logging component 132 may provide means for receiving a third signal indicating that a second alarm initiating device has entered a test mode in response to activation of a test switch of the second alarm initiating device; updating, at the control panel, the device information to indicate that the second alarm initiating device has entered the test mode; determining that a fourth signal indicating detection of a hazard indication at the second alarm initiating device has not been received within a predefined period of time; and logging, at the control panel, lack of receipt of an indication during the test mode of the second alarm initiating device.

In some aspects, in the method 600, receiving the first signal indicating that the alarm initiating device has entered the test mode, includes identifying analog information corresponding to the test mode within the first signal. Accordingly, the control panel 102, the computing device 700, and/or the processor 702 executing the status management component 130 may provide means for identifying analog information corresponding to the test mode within the first signal.

In some aspects, in the method 600, receiving, at the control panel, the second signal indicating the detection of the hazard indication, includes: detecting, within the second signal, analog information corresponding to the detection of the hazard indication at the alarm initiating device; and determining an occurrence of a hazard based on comparing the analog information to a threshold value. Accordingly, the control panel 102, the computing device 700, and/or the processor 702 executing the hazard detection component 131 may provide means for detecting, within the second signal, analog information corresponding to the detection of the hazard indication at the alarm initiating device; and determining an occurrence of a hazard based on comparing the analog information to a threshold value.

In some aspects, in the method 600, receiving, at the control panel, the second signal indicating the detection of the hazard indication, includes: receiving, based upon a request by the control panel to the alarm initiating device, the second signal indicating the detection of the hazard indication; detecting, within the second signal, analog information corresponding to the detection of the hazard indication at the alarm initiating device; and determining an occurrence of a hazard based on comparing analog information to a threshold value. Accordingly, the control panel 102, the computing device 700, and/or the processor 702 executing the hazard detection component 131 may provide means for receiving, based upon a request by the control panel to the alarm initiating device, the second signal indicating the detection of the hazard indication; detecting, within the second signal, analog information corresponding to the detection of the hazard indication at the alarm initiating device; and determining an occurrence of a hazard based on comparing analog information to a threshold value.

Figure 7:
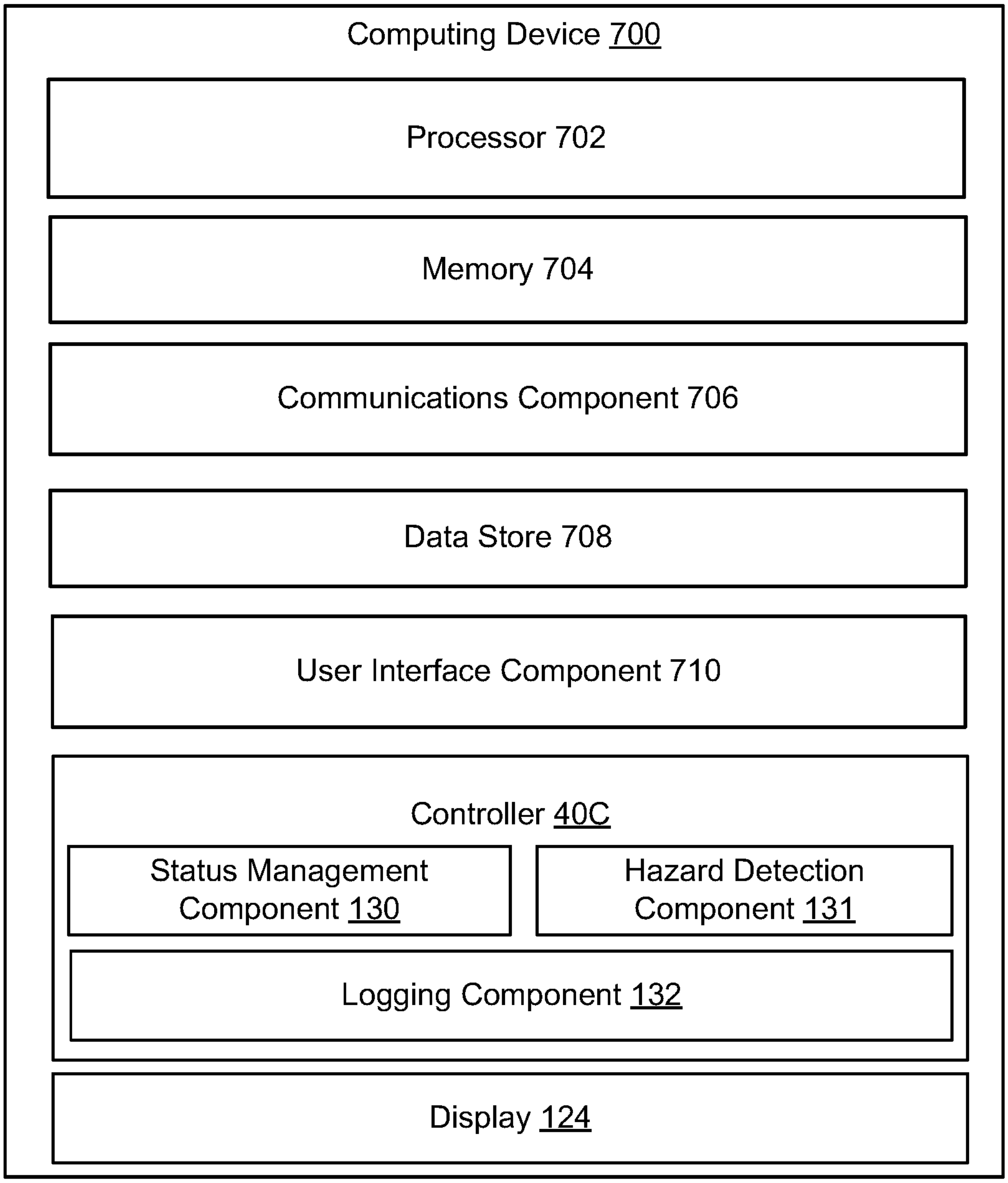
FIG. 7 is a block diagram illustrating an example of a hardware implementation for a control panel, in accordance with some aspects of the present disclosure.

Referring to FIG. 7, a computing device 700 may implement all or a portion of the functionality described herein. The computing device 700 may be or may include or may be configured to implement the functionality of at least a portion of the alarm system 100, or any component therein. For example, the computing device 700 may be or may include or may be configured to implement the status management component 130, the hazard detection component 131, and the logging component 132. The computing device 700 includes a processor 702 which may be configured to execute or implement software, hardware, and/or firmware modules that perform any functionality described herein. For example, the processor 702 may be configured to execute or implement software, hardware, and/or firmware modules that perform any functionality described herein with reference to the status management component 130, the hazard detection component 131, and the logging component 132, or any other component/system/device described herein.

The processor 702 may be a micro-controller, an application-specific integrated circuit (ASIC), a digital signal processor (DSP), or a field-programmable gate array (FPGA), and/or may include a single or multiple set of processors or multi-core processors. Moreover, the processor 702 may be implemented as an integrated processing system and/or a distributed processing system. The computing device 700 may further include a memory 704, such as for storing local versions of applications being executed by the processor 702, related instructions, parameters, etc. The memory 704 may include a type of memory usable by a computer, such as random-access memory (RAM), read only memory (ROM), tapes, magnetic discs, optical discs, volatile memory, non-volatile memory, and any combination thereof. Additionally, the processor 702 and the memory 704 may include and execute an operating system executing on the processor 702, one or more applications, display drivers, etc., and/or other components of the computing device 700.

Further, the computing device 700 may include a communications component 706 that provides for establishing and maintaining communications with one or more other devices, parties, entities, etc. utilizing hardware, software, and services. The communications component 706 may carry communications between components on the computing device 700, as well as between the computing device 700 and external devices, such as devices located across a communications network and/or devices serially or locally connected to the computing device 700. In an aspect, for example, the communications component 706 may include one or more buses, and may further include transmit chain components and receive chain components associated with a wireless or wired transmitter and receiver, respectively, operable for interfacing with external devices.

Additionally, the computing device 700 may include a data store 708, which can be any suitable combination of hardware and/or software, that provides for mass storage of information, databases, and programs. For example, the data store 708 may be or may include a data repository for applications and/or related parameters not currently being executed by processor 702. In addition, the data store 708 may be a data repository for an operating system, application, display driver, etc., executing on the processor 702, and/or one or more other components of the computing device 700.

The computing device 700 may also include a user interface component 710 operable to receive inputs from a user of the computing device 700 and further operable to generate outputs for presentation to the user (e.g., via a display interface to a display device). The user interface component 710 may include one or more input devices, including but not limited to a keyboard, a number pad, a mouse, a touch-sensitive display, a navigation key, a function key, a microphone, a voice recognition component, or any other mechanism capable of receiving an input from a user, or any combination thereof. Further, the user interface component 710 may include one or more output devices, including but not limited to a display interface, a speaker, a haptic feedback mechanism, a printer, any other mechanism capable of presenting an output to a user, or any combination thereof.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method, comprising:

receiving, at a control panel, a first signal indicating that an alarm initiating device has entered a test mode in response to activation of a test switch of the alarm initiating device;

updating, at the control panel, device information to indicate that the alarm initiating device has entered a test mode;

receiving, at the control panel, a second signal indicating detection of a hazard indication at the alarm initiating device;

updating, at the control panel, the device information to indicate that the alarm initiating device has exited the test mode in response to information in the second signal indicating the alarm initiating device has exited the test mode; and preventing an alarm alert process of the control panel associated with the hazard indication based upon on the device information indicating that the alarm initiating device has entered the test mode.

2. The method of claim 1, further comprising:

logging, at the control panel, receipt of the hazard indication during the test mode of the alarm initiating device; or displaying, via a graphical user interface, a notification identifying receipt of the hazard indication during the test mode of the alarm initiating device when the second signal fails to include the information indicating the alarm initiating device has exited the test mode.

3. The method of claim 1, wherein the alarm initiating device is a first alarm initiating device, and further comprising:

receiving, at the control panel, a third signal indicating that a second alarm initiating device has entered a test mode in response to activation of a test switch of the second alarm initiating device;

updating, at the control panel, the device information to indicate that the second alarm initiating device has entered the test mode;

determining that a fourth signal indicating detection of a hazard indication at the second alarm initiating device has not been received within a predefined period of time; and logging, at the control panel, lack of receipt of an indication during the test mode of the second alarm initiating device.

4. The method of claim 1, wherein receiving the first signal indicating that the alarm initiating device has entered the test mode, comprises: identifying analog information corresponding to the test mode within the first signal.

5. The method of claim 1, wherein receiving, at the control panel, the second signal indicating the detection of the hazard indication, comprises:

detecting, within the second signal, analog information corresponding to the detection of the hazard indication at the alarm initiating device; and determining an occurrence of a hazard based on comparing the analog information to a threshold value.

6. The method of claim 1, wherein receiving, at the control panel, the second signal indicating the detection of the hazard indication, comprises:

receiving, based upon a request by the control panel to the alarm initiating device, the second signal indicating the detection of the hazard indication;

detecting, within the second signal, analog information corresponding to the detection of the hazard indication at the alarm initiating device; and determining an occurrence of a hazard based on comparing analog information to a threshold value.

7. The method of claim 1, wherein the alarm initiating device includes at least one of a smoke sensor, a heat sensor, a carbon monoxide detector, or a pull station.

8. A non-transitory computer-readable device storing instructions thereon that, when executed by at least one computing device, causes the at least one computing device to perform operations comprising:

receiving, at a control panel, a first signal indicating that an alarm initiating device has entered a test mode in response to activation of a test switch of the alarm initiating device;

updating, at the control panel, device information to indicate that the alarm initiating device has entered a test mode;

receiving, at the control panel, a second signal indicating detection of a hazard indication at the alarm initiating device;

updating, at the control panel, the device information to indicate that the alarm initiating device has exited the test mode in response to information in the second signal indicating the alarm initiating device has exited the test mode; and preventing an alarm alert process of the control panel associated with the hazard indication based upon on the device information indicating that the alarm initiating device has entered the test mode.

9. The non-transitory computer-readable device of claim 8, wherein the operations further comprise:

logging, at the control panel, receipt of the hazard indication during the test mode of the alarm initiating device; or displaying, via a graphical user interface, a notification identifying receipt of the hazard indication during the test mode of the alarm initiating device when the second signal fails to include the information indicating the alarm initiating device has exited the test mode.

10. The non-transitory computer-readable device of claim 8, wherein the alarm initiating device is a first alarm initiating device, and the operations further comprising:

receiving, at the control panel, a third signal indicating that a second alarm initiating device has entered a test mode in response to activation of a test switch of the second alarm initiating device;

updating, at the control panel, the device information to indicate that the second alarm initiating device has entered the test mode;

determining that a fourth signal indicating the detection of a hazard indication at the second alarm initiating device has not been received within a predefined period of time; and logging, at the control panel, lack of receipt of an indication during the test mode of the second alarm initiating device.

11. The non-transitory computer-readable device of claim 8, wherein receiving the first signal indicating that the alarm initiating device has entered the test mode, comprises: identifying analog information corresponding to the test mode within the first signal.

12. The non-transitory computer-readable device of claim 8, wherein receiving, at the control panel, the second signal indicating the detection of the hazard indication, comprises:

detecting, within the second signal, analog information corresponding to the detection of the hazard indication at the alarm initiating device; and determining an occurrence of a hazard based on comparing the analog information to a threshold value.

13. The non-transitory computer-readable device of claim 8, wherein receiving, at the control panel, the second signal indicating the detection of the hazard indication, comprises:

receiving, based upon a request by the control panel to the alarm initiating device, the second signal indicating the detection of the hazard indication;

detecting, within the second signal, analog information corresponding to the detection of the hazard indication at the alarm initiating device; and determining an occurrence of a hazard based on comparing the analog information to a threshold value.

14. An alarm system, comprising:

an alarm initiating device that detects a hazard indication and includes a test switch is a magnetic reed switch that is activated when a hood of a test tool is placed over the alarm initiating device, the hood including a magnet that comes within proximity of the magnetic reed switch to activate the magnetic reed switch; and a control panel that includes:

one or more memories storing instructions; and one or more processors communicatively coupled with the one or more memories and configured to execute the instructions to:

receive, at a control panel, a first signal indicating that an alarm initiating device has entered a test mode in response to activation of a test switch of the alarm initiating device;

update, at the control panel, device information to indicate that the alarm initiating device has entered a test mode;

receive, at the control panel, a second signal indicating detection of a hazard indication at the alarm initiating device; and update, at the control panel, the device information to indicate that the alarm initiating device has exited the test mode in response to information in the second signal indicating the alarm initiating device has exited the test mode; and prevent an alarm alert process of the control panel associated with the hazard indication based upon on the device information indicating that the alarm initiating device has entered the test mode.

15. The alarm system of claim 14, wherein the one or more processors are configured to:

log, at the control panel, receipt of the hazard indication during the test mode of the alarm initiating device; or display, via a graphical user interface, a notification identifying receipt of the hazard indication during the test mode of the alarm initiating device when the second signal fails to include the information indicating the alarm initiating device has exited the test mode.

16. The alarm system of claim 14, wherein the alarm initiating device is a first alarm initiating device, and the one or more processors are configured to:

receive, at the control panel, a third signal indicating that a second alarm initiating device has entered a test mode in response to activation of a test switch of the second alarm initiating device;

update, at the control panel, the device information to indicate that the second alarm initiating device has entered the test mode;

determine that a fourth signal indicating the detection of a hazard indication at the second alarm initiating device has not been received within a predefined period of time; and log, at the control panel, lack of receipt of an indication during the test mode of the second alarm initiating device.

17. The alarm system of claim 14, wherein the alarm initiating device is a smoke sensor, heat sensor, carbon monoxide detector, and/or pull station of the alarm system.

* * * * *